(12) United States Patent  
Curlander et al.

(10) Patent No.: US 9,174,800 B1  
(45) Date of Patent: Nov. 3, 2015

(54) VERIFYING BIN CONTENT IN A MATERIALS HANDLING FACILITY

(71) Applicant: Amazon Technologies, Inc., Reno, NV (US)

(72) Inventors: James Christopher Curlander, Mercer Island, WA (US); Jules Cook Graybill, Seattle, WA (US); Marshall Friend Tappen, Bainbridge Island, WA (US); Barry James O'Brien, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 35 days.

(21) Appl. No.: 14/225,317

(22) Filed: Mar. 25, 2014

(51) Int. Cl.
*G06K 9/00* (2006.01)
*B65G 1/02* (2006.01)

(52) U.S. Cl.
CPC .......................................... *B65G 1/02* (2013.01)

(58) Field of Classification Search
CPC . G06K 9/6253; G06K 9/228; H04N 1/00127; H04N 1/00336; H04N 1/00244; H04N 1/2133; H04N 1/32101; H04N 1/00307; H04N 1/00328; H04N 1/00331; H04N 2101/00; H04N 2101/3278; H04N 2201/3225; H04N 2201/3274; H04N 2201/0084; G06F 17/30244; G06F 17/30241; G06F 17/30256; G06F 17/30265; G06F 17/30867; G06F 17/3087; G06F 17/30879
USPC .......................................................... 382/103
See application file for complete search history.

(56) References Cited

U.S. PATENT DOCUMENTS

| | | | |
|---|---|---|---|
| 7,693,757 B2 | 4/2010 | Zimmerman | |
| 8,438,084 B1 | 5/2013 | Tesler et al. | |
| 8,873,829 B1 * | 10/2014 | Tyra et al. | 382/140 |
| 2007/0124216 A1 * | 5/2007 | Lucas | 705/27 |
| 2008/0294536 A1 * | 11/2008 | Taylor et al. | 705/28 |
| 2011/0282476 A1 | 11/2011 | Hegemier et al. | |
| 2013/0223673 A1 | 8/2013 | Davis et al. | |
| 2015/0012396 A1 | 1/2015 | Puerini et al. | |
| 2015/0019391 A1 * | 1/2015 | Kumar et al. | 705/28 |

* cited by examiner

*Primary Examiner* — Ali Bayat
(74) *Attorney, Agent, or Firm* — Arthorus, PLLC

(57) ABSTRACT

This disclosure describes a device and system for verifying the content of items in a bin within a materials handling facility. In some implementations, a bin content verification apparatus may pass by one or more bins and capture images of those bins. The images may be processed to determine whether the content included in the bins has changed since the last time images of the bins were captured. A determination may also be made as to whether a change to the bin content was expected and, if so, if the determined change corresponds with the expected change.

20 Claims, 11 Drawing Sheets

VERIFYING BIN CONTENT IN A MATERIALS HANDLING FACILITY

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, etc. Many of those physical stores also maintain inventory in a storage area, or fulfillment center, that can be used to replenish inventory located in the shopping areas and/or to satisfy orders for items that are placed through other channels (e.g., e-commerce). Other examples of entities that maintain inventory include libraries, museums, rental centers, and the like. In many instances, the inventory is stored in bays. The bays may be divided into shelves to increase the total storage capacity of the bay. Likewise, the shelves may be divided into bins, with each bin containing content of one or more items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
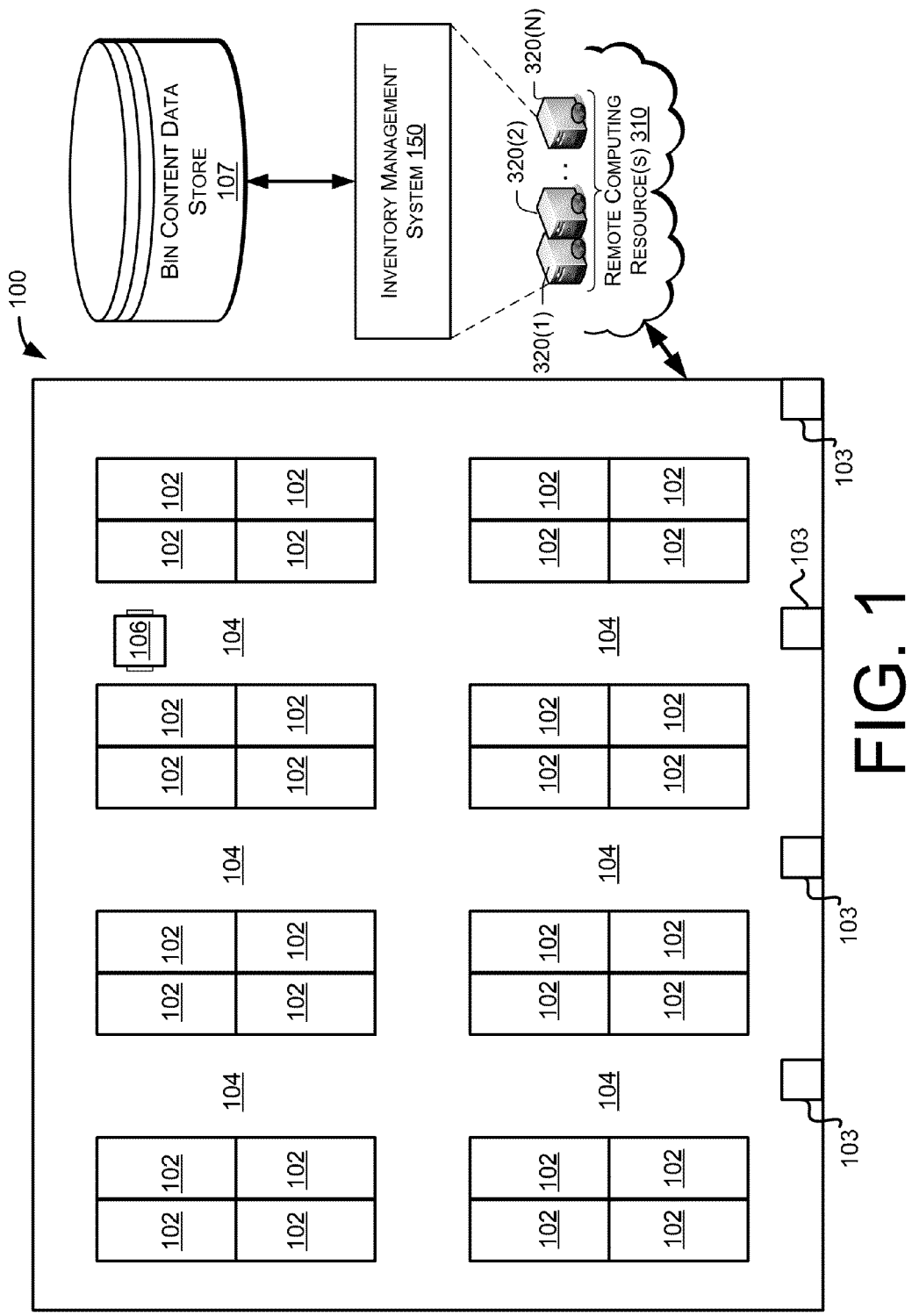
FIG. 1 is a block diagram illustrating top down view of a storage area within a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an apparatus and system for verifying the content of items included in a bin within a materials handling facility. Multiple bins may be on shelves of bays and/or inventory holders within a materials handling facility and the bins are used to store one or more items of inventory. Agents (referred to herein, for example, as "picking agents" or "stowing agents") receive instructions as to which bin to pick an item from, or into which bin to stow an item. Bin information identifying each item stored in the bin is maintained by an inventory management system and utilized to maintain inventory information (e.g., item quantity and locations), provide stowing agents with instructions on where to stow an inventory item and to provide instructions to picking agents identifying the bin from which an item is to be picked.

In some implementations, bins may be included on mobile bays (also referred to herein as inventory holders) that are moved from a storage location to an operating location by an automated mobile vehicle, such as a Kiva® mobile drive unit. In such an implementation, rather than a picking agent and/or stowing agent moving through the materials handling facility picking/stowing items at a stationary bin, the bin is moved through the materials handling facility to the operating location where a picking agent or stowing agent is located. The operating location may be the location where an agent picks items from the inventory holder, stows items onto the inventory holder and/or performs any other operations with respect to the inventory holder.

As items are picked, moved and/or stowed at different locations within a materials handling facility, it is difficult to maintain an accurate count of items included in a bin. For example, an agent may pick the wrong item from a bin, stow an item into the wrong bin, an item may fall out of a bin and be returned to a different bin, etc. Because of these inconsistencies, it is necessary to periodically verify the content of items included in bins within the materials handling facility. Typical solutions include an agent manually verifying that the items within the bin correspond with the bin information stored by the materials handling facility. However, as materials handling facilities grow in size, this solution requires a large number of agents to complete. In addition, with the number of bins to be verified, the likelihood of an error increases.

The implementations described herein provide a mechanism to reduce or eliminate the number of bins that need agent verification. As discussed below, a bin content verification apparatus ("BCV apparatus") may be moved down aisles of rows and images of bins captured. The images are correlated with previously stored images of the bins and compared to determine if the content of the bin has changed. A determination is also made as to whether there was an expected change to the bin content. If there was not change to the content of the bin and no expected change, it is determined that the bin content is accurate and does not need agent verification. If it is determined, based on a comparison of correlated images, that there was a change to the bin content, that a change to the content was expected, and that the actual change corresponds with the expected change, then the bin content is also considered accurate and does not need agent verification. In contrast, if it is determined that a content change occurred but no change was expected, it is determined that the content of the bin is not accurate and agent verification is needed. Likewise, if it is determined that a change occurred but the change does not correspond with an expected change, agent verification may be requested.

In a similar manner, for bins and/or inventory holders that are moved from a storage location to an operating location, rather than moving a BCV apparatus down aisles of rows, the BCV apparatus may be at a fixed location and one or more images of the inventory holder and/or bins may be captured while the inventory holder is arriving at, departing from, or otherwise located at an operating location. For example, images of the bins of an inventory holder may be captured as the inventory holder approaches the operating location. The captured images may then be correlated with previously stored images and compared to determine if the content of the bin has changed. The previously stored images may be, for example, images of the bin captured as the bin was leaving an operating location at a previous point in time. Comparing current bin images of a bin as it arrives at an operating location with images of the bin as it departed an operating location at a previous point in time can be used to determine if the contents of the bin have changed between those two points in time.

As another example, images of a bin may be captured as the bin arrives at an operating location and stored. The agent may then perform their operations (e.g., picking and/or stowing), and as the inventory holder is departing, images of the bin may be captured, correlated with the stored images and compared to determine if any change to the bin has occurred as a result of the operations performed by the agent.

By automatically processing images to determine if the contents of bins are accurate or not accurate, the amount of agent resources and time needed for bin content verification is greatly reduced. For example, in many materials handling facilities more than 85% of the bins either have not changed or it can be determined through image processing that the actual content change corresponds with an expected content change. By eliminating 85% of the bins from manual agent review, the cost and time required to verify bin content are greatly reduced. Also, by reducing the bin content verification to only those bins that are determined to likely not be accurate, manual review by agents is more focused and thus has a lower likelihood of the agent introducing an error.

In one implementation, a BCV apparatus that includes multiple cameras configured to capture images of bins as the BCV apparatus is moved down rows of bays is provided.

As the BCV apparatus is moved down rows of bays, images of the bins included in the bays on either side of the BCV apparatus may be automatically captured and processed to determine the contents included in each bin. For example, each bay may include visual identifiers (e.g., barcodes, bokodes, different colors, different shapes), each visual identifier representing a bin location within the bay. As images of the bay are captured, the images may be processed to detect the visual identifiers and determine which images correspond with which bins of the bay and/or which sides of an inventory holder. Edge detection, object detection or other techniques may also be used to determine the edges or boundaries of the bins corresponding to each visual identifier.

For each bin, images of the bin may be identified and compared with stored images of the bin that were previously captured. For example, images of bins may be captured every night and images from the current night may be correlated with bins and compared to images captured the previous night that are also correlated with the bins. Based on a comparison of the images, it may be determined whether the content of the bin has changed. Likewise, the inventory management system may determine if a change to the content of the bin was expected (e.g., were pick and/or stow instructions relating to the bin issued to an agent). If it is determined that a content change occurred that was not expected, an agent may be instructed to verify the content of the bin.

In another implementation, the BCV apparatus may be stationary and configured to capture images of bins of bays located on mobile inventory holders as they arrive and/or depart from an operating location. In such an implementation, the BCV apparatus may be stationary and include one or more image capture devices and one or more illumination elements (e.g., lights). For example, one BCV apparatus may be positioned at or near the operating location to capture images of an inventory holder as it arrives at the operating location. The BCV apparatus and/or another BCV apparatus positioned at or near the operating location may capture images of the inventory holder as it departs from the operating location.

The BCV apparatus may include multiple image capture devices (e.g., cameras) aligned to capture images of the bins of an inventory holder from a fixed distance and position. Each image capture device may have an overlapping field of view that together image the entire face of the inventory holder. In addition, each image capture device may be angled downward so that the field of view is directed down and into the inventory holder at an angle, thereby allowing imaging of items in the inventory holder that may otherwise be obscured by a retention barrier of the inventory holder that is positioned to assist in keeping items from sliding off of the inventory holder while the inventory holder is being transported. The retention member may be, for example, a band that extends around the perimeter of each bin or shelf included in the inventory holder, an elongated edge that extends upward and perpendicular to a bin or shelf of the inventory holder, etc. The BCV apparatus may also include multiple illumination elements (e.g., lights) that illuminate the inventory holder as images are captured.

The BCV apparatus may also include one or more distance determining elements, such as ranging lasers, proximity sensors, ultrasonic sensors, etc., configured to determine the location and/or position of an inventory holder as it approaches and/or departs an operating location. The distance determining elements may be configured to cause the illumination elements to illuminate the inventory holder and the image capture devices to capture one or more images of the inventory holder when the inventory holder is a defined distance from the BCV apparatus. In another implementation, the depth of the image capture devices field of view may be fixed and a sensor may monitor the field of view for a visual identifier included on the inventory holder. When the visual identifier enters the field of view, the sensor may cause the illumination elements to illuminate and when the visual identifier comes into focus in the field of view, the sensor may cause the image capture devices to capture one or more images of the inventory holder. By fixing the field of view of the image capture devices and capturing images when the visual identifier of the inventory holder is in focus, the inventory holders will be at approximately the same distance when imaged.

In still another implementation, a load cell, scale, or other pressure sensor may be included on or in the floor of the materials handling system at a defined distance from a fixed BCV apparatus. In such an implementation, when a mobile drive unit carrying an inventory holder passes over the pressure sensor, the pressure sensor may instruct the BCV apparatus to illuminate the inventory holder and capture one or more images of the inventory holder. In some implementations, rather than causing the illumination elements to illuminate before or when the images are captured, the illumination elements may remain illuminated regardless of whether an inventory holder is present and/or whether images are being captured.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling. A bay, as used herein, is any physical structure or location at which one or more items of inventory may be stored or otherwise located. A bay may be divided into one or more bins in which content (e.g., items) is stored. For example, a bay may include a series of shelves and the shelves may be divided into one or more bins, as illustrated and discussed in further detail with respect to FIG. 2A. Alternatively, the bay and the bin may both constitute a location within the materials handling facility for storing a large item or a large quantity of items (e.g., a pallet of items). In such an instance, the bay may include only a single bin. As will be appreciated, a bay includes at least one bin, but may include any number of bins. Likewise, a bay may be mobile and configured such that it can be transported by a mobile drive unit, also referred to herein as an inventory holder.

FIG. 1 is a block diagram illustrating a top down view of a storage area 100 within a materials handling facility configured to store inventory items, according to some implementations. As shown, the storage area includes bays 102 for storing inventory items. Any number, type and/or size of bay may be included in the storage area. As shown, multiple bays may be arranged adjacent to one another and/or across from one another to establish a series of rows within the storage area 100. In this example, the bays 102 are arranged in rows 104 such that an agent and/or BCV apparatus 106 may progress through the rows. For example, an agent may progress through the rows 104, pick items from bins of the bays 102, and/or store items in bins of the bays 102.

Alternatively, or in addition thereto, some or all of the bays may be mobile, also referred to herein as inventory holders, and configured so that a mobile drive unit (not shown) can retrieve the bay and deliver it to an operating location 103. When the bay arrives at the operating location, an agent located at the operating location may perform one or more operations (e.g., picking and/or stowing). After the agent has completed operations, the bay may be removed from the operating location by the mobile drive unit and returned to a storage location, taken to another operating location, etc.

The materials handling facility may be configured to receive different kinds of inventory items from various suppliers, vendors, etc., and to store those items until a customer orders or retrieves one or more of the items. In various implementations, items may include merchandise, commodities, perishables, or any suitable type of item depending on the nature of the enterprise that operates the materials handling facility.

Upon being received from a supplier, items may be prepared for storage in the storage area 100. For example, in some implementations, items may be unpacked or otherwise rearranged, and the inventory management system 150 (which, as described below, may include one or more software applications executing on a computer system) may be updated to reflect the type, quantity, condition, cost, location or any other suitable parameters with respect to newly received items. It is noted that items may be stocked, managed or dispensed in terms of countable, individual units or multiples of units, such as packages, cartons, crates, pallets or other suitable aggregations. Alternatively, some items such as bulk products, commodities, etc., may be stored in continuous or arbitrarily divisible amounts that may not be inherently organized into countable units. Such items may be managed in terms of measurable quantities such as units of length, area, volume, weight, time duration or other dimensional properties characterized by units of measurement. Generally speaking, a quantity of an item may refer to either a countable number of individual or aggregate units of an item or a measurable amount of an item, as appropriate.

After arriving and being prepared for storage, items may be stored within the storage area 100. In some implementations, like items may be stored or displayed together in one or more bins of a bay, or adjacent bins, such that all items of a given kind are stored in one location. In other implementations, like items may be stored in different locations. For example, to optimize retrieval of certain items having high turnover within a large physical facility, those items may be stored in several different bins throughout the storage area 100 to reduce congestion that might occur at a single point of storage.

When a customer order specifying one or more items is received, the corresponding items may be selected or "picked" from a bin within the storage area 100. In various implementations, item picking may range from manual to completely automated picking. In other implementations, materials handling facility employees (agents) may pick items using written or electronic pick lists derived from customer orders and place picked items into a tote, cart, etc., as the materials handling facility agent progresses through the storage area 100.

As discussed in more detail below, as items are picked and/or as inventory within the storage area is replenished with new inventory, the actual items in a bin may begin to vary from the virtual inventory maintained by the inventory management system as to what items should be included in the bin. For example, if new inventory is being added to a bin within the storage area, the agent may place the item in an adjacent bin rather than the bin in which the item is expected to be stored. As another example, an item may fall from a bin and when replaced, it may be placed in a different bin. Likewise, in other instances, an agent may pick the wrong item from the bin, resulting in the stored bin inventory information not matching the actual bin inventory.

In each such instance, the actual content (items) included in the bins within the materials handling facility change and the stored bin content information needs to be updated accordingly. Unfortunately, the stored bin content information may not always be updated by the agent making the change, or any other agent, and/or the update may be done incorrectly. To resolve this error, the content of the bins within the storage area 100 needs to be verified so that the stored bin content information utilized by the inventory management system 150 can be correctly maintained.

The storage area 100 may also include or be in communication with an inventory management system 150 that is configured to receive and/or provide information to agents, BCV apparatuses, mobile drive units, and/or other entities within the storage area 100 or other areas of the materials handling facility. Generally, the inventory management system 150 may include one or more communication devices that facilitate wireless communication (e.g., Wi-Fi, NFC, Bluetooth) between the inventory management system 150 and the BCV apparatus 300, 410, 420 (discussed below).

The inventory management system 150 may be implemented on one or more computing resources. The computing resources may be local and/or remote. As illustrated, the inventory management system 150 is implemented on remote computing resources 310, which may include one or more servers 320(1), 320(2), . . . , 320(N) and may, in some instances, form a portion of a network-accessible computing platform implemented as a computing infrastructure of processors, storage, software, data access, etc. The computing resources 310 do not require end-user knowledge of the physical location and configuration of the system that delivers the services. Common expressions associated for the remote server system 320 include "on-demand computing," "software as a service (SaaS)," "platform computing," "network-accessible platform," "cloud services," "data centers," and so forth.

The computing resources 310 may also include a bin content data store 107, and/or other data stores. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The bin content data store 107 may contain stored bay configuration information. Stored bay configuration information includes information about each bay, such as the number and/or arrangement of bins within the bay, the location of the bay within the storage area 100, a virtual representation of the bay configuration, the identifiers associated with the bay, etc.

The bin content data store 107 may be integrated with the inventory management system 150 or otherwise communicatively coupled with the inventory management system 150. For example, the bin content data store 107 may be located at a remote computing resource and communicatively coupled with the server system 320 that implements the inventory management system 150. In some implementations, the bin content data store 107 may include one or more CD-RW/DVD-RW drives, hard disk drives, solid-state drives, tape drives, or other storage devices that are utilized to store digital content and information.

The inventory management system 150 may utilize antennas within the materials storage area 100 of the materials handling facility to create a local wireless network (e.g., Wi-Fi) so that a BCV apparatus can connect to and communicate with the inventory management system 150. Likewise, in instances when one or more of the components of the inventory management system 150 are remote from the materials handling facility and/or the storage area 100, those components may communicate with other components of the inventory management system 150 and/or the BCV apparatus via a network.

The organization and operation of the storage area 100 within a materials handling facility described above is given as an example. In other implementations, a materials handling facility and/or storage area may be arranged differently and operate differently than described above.

Figure 2A:
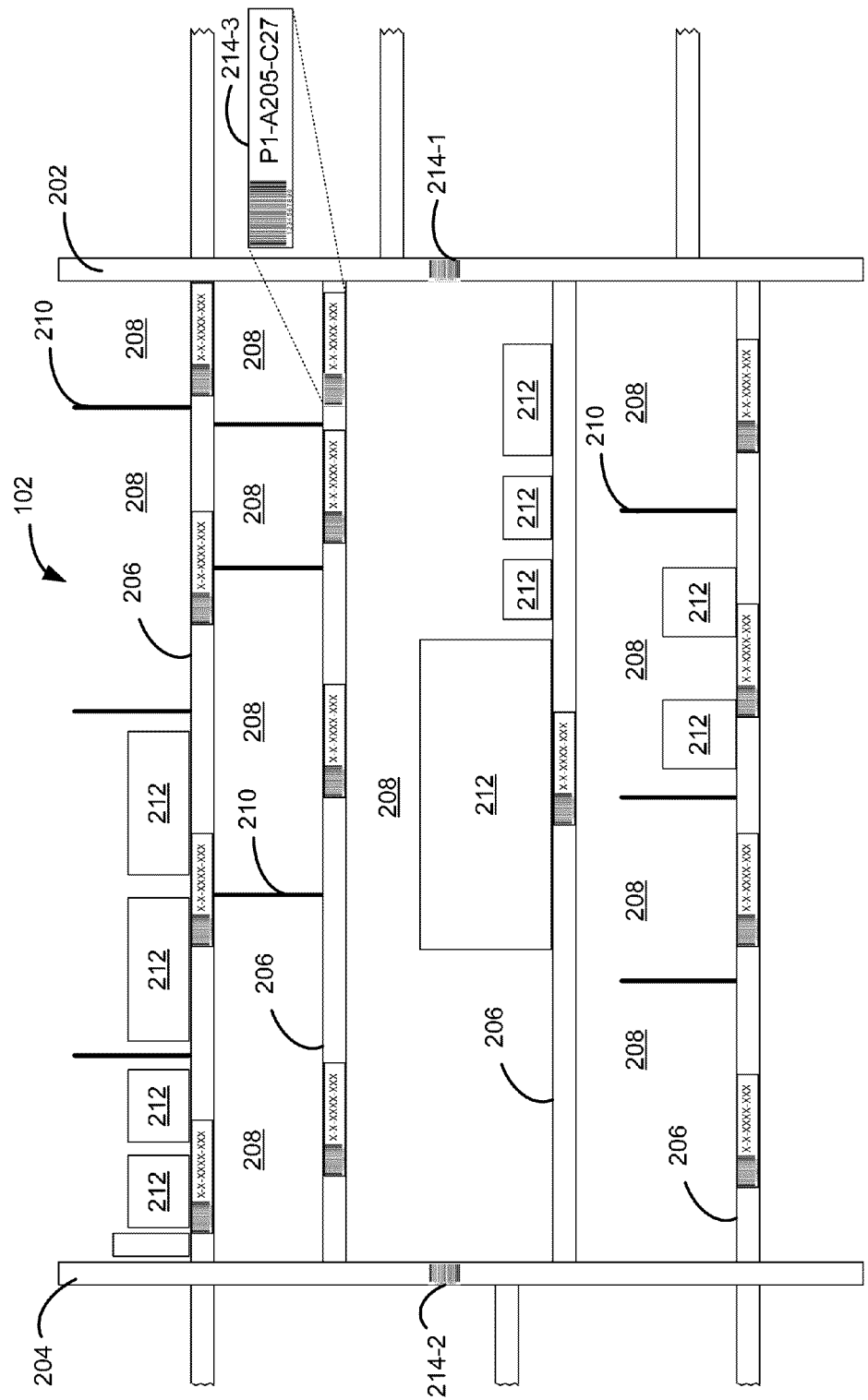
FIG. 2A is a block diagram of a stationary bay with bins within the storage area, according to some implementations.

FIG. 2A is a block diagram of a side view of a stationary bay 102 that includes multiple bins 208, according to some implementations. In this example, the bay 102 includes two ends 202, 204 adjacent to which additional bays with shelves extend. The bay 102 in this example includes four shelves 206. A bay may include any number of shelves or no shelves (e.g., the bay may just be a location within the storage area 100). Likewise, as illustrated, the shelves 206 of the bay 102 may include any number of bins 208. Bins 208 may be established through the use of dividers 210 that provide a physical separation between two different sections of the bay. Alternatively, if a shelf does not include a divider, the entire shelf may be considered a bin. Likewise, if the bay does not include any shelves or dividers, the bay may be considered as a single bin. The dividers 210 may be any physical structure used to divide or otherwise separate a bay. For example, a divider 210 may be a metal or plastic divider that can be affixed to a shelf such that it is perpendicular to the shelf. Alternatively, the divider may be a piece of corrugate that is folded or placed on the shelf to divide or otherwise separate the shelf.

Items 212 of different sizes and/or shapes may be stored in bins of a bay. As discussed above, a bin may include one or more items 212 of the same type and/or items of different types, shapes and/or sizes. A group of items in a bin are collectively referred to herein as the bin content or content of the bin. Agents may stow and/or pick items from the bins and, in some implementations, may move, add and/or remove dividers from the bays thereby altering the configuration of the bay by increasing and/or decreasing the number of bins.

In some implementations, the bay may be identified by a visual identifier 214 located on the bay. The visual identifier 214 may be, for example, a barcode, bokode, QR code, color, shape, character, image, size, or any other identifier than can be used to identify the bay. In implementations where bays are arranged adjacent to one another and/or share vertical ends 202, 204, a visual identifier 214 may be positioned in a consistent manner so that it can be determined to which bay the visual identifier corresponds. For example, the visual identifier 214-1 for the bay 102 may be positioned on the right side of the bay 102 when facing the bay 102. This may be done for each bay. As such, the visual identifier 214-2 may correspond to the next adjacent bay.

Visual identifiers 214 may also be utilized to identify bins within each bay. For example, visual identifiers 214-3 each represent a bin 208 within the bay 102. When bins are added, removed or adjusted, the corresponding visual identifiers may be added, removed and/or adjusted to correspond to the modified, added and/or removed bin. In some implementations, the visual identifiers may include multiple types of identification. For example, visual identifier 214-3 may include both a barcode and human-readable information, in this example P1-A205-C27. P1 may represent the floor of the materials handling facility on which the bin is located, A205 may represent the row on which the bin is located and C27 may identify the bin.

Information about the bin, such as the bin location, size, shape, weight capacity, inventory items, etc., may also and/or alternatively be maintained in a bin configuration data store accessible by the inventory management system 150. When the visual identifier is detected, it may be provided to the inventory management system 150 and the information associated with the visual identifier may be obtained.

In some implementations, the separation of bins may be determined by identifying the dividers that are included in the bays to establish the bins. For example, an image processing algorithm, such as an edge detection algorithm and/or an object detection algorithm, may be configured to identify the position of each divider 210 and thereby determine the separation of bins within a bay. This may be done alone or in conjunction with identifying the visual identifiers.

While the examples discussed herein utilize visual identifiers and/or dividers to detect and/or obtain information about bays and bins, in other implementations other forms of identifiers may be utilized. For example, active identifiers, such as radio frequency identifier tags ("RFID") may be used to provide information about bins and/or bays. In such an implementation, an active identifier reader may be utilized to detect the presence of active identifiers and to obtain information associated with the visual identifiers. Generally, the active tag reader may utilize one or more wireless technologies (e.g., RFID, near field communication ("NFC"), Bluetooth, infrared) to detect active identifiers.

Figure 2B:
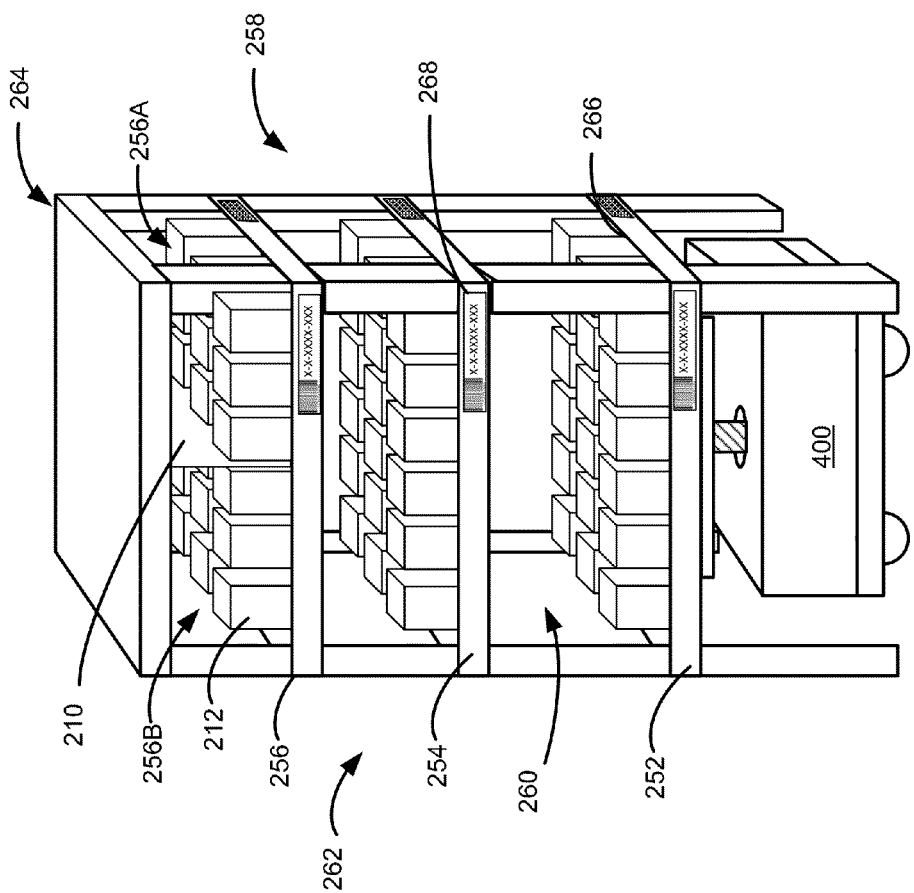
FIG. 2B is a block diagram of a movable bay, also referred to as in inventory holder, according to some implementations.

FIG. 2B is a block diagram of a movable bay or inventory holder 250 that includes multiple shelves 252, 254, 256, each shelf representing a bin, according to some implementations. In this example, the inventory holder 250 is configured to couple with and be moved by a mobile drive unit 400. Specifically, in this example, the mobile drive unit 400 may position itself under the inventory holder 250 and lift the inventory holder 250 to enable movement of the inventory holder.

While the inventory holder 250 includes three shelves, in other configurations, additional or fewer shelves may be included on an inventory holder. Likewise, the top shelf 256 of the inventory holder 250 is divided into two bins 256A and 256B. The other shelves 252, 254 are each configured as single bins. In other implementations, the shelves may be divided into additional or fewer bins. Bins may be established through the use of dividers 210 that provide a physical separation between two different sections of the shelf. The dividers 210 may be any physical structure used to divide or otherwise separate a shelf. For example, a divider 210 may be a metal or plastic divider that can be affixed to a shelf such that it is perpendicular to the shelf. Alternatively, the divider may be a piece of corrugate that is folded or placed on the shelf to divide or otherwise separate the shelf.

Each shelf 252-256 of the inventory holder may also include a retention barrier 266 that is positioned around the perimeter of each shelf 252-256 of the inventory holder 250 to assist in keeping items 212 from sliding off of the inventory holder 250 while the inventory holder 250 is being transported by the mobile drive unit 400. The retention barriers 266 may be, for example, a band that extends around the perimeter of each shelf, an elongated edge that extends upward and perpendicular to a bin or shelf of the inventory holder, etc.

The inventory holder 250 illustrated in FIG. 2B includes four sides—side-1 258, side-2 260, side-3 262 and side-4 264. In other implementations, the inventory holder may be configured with additional or fewer sides. Items 212 of different sizes and/or shapes may be stored in bins of the inventory holder 250. As discussed above, a bin may include one or more items 212 of the same type and/or items of different types, shapes and/or sizes. A group of items in a bin are collectively referred to herein as the bin content or content of the bin. Agents may stow and/or pick items from the bins and, in some implementations, may move, add and/or remove dividers from the inventory holder thereby altering the configuration of the inventory holder by increasing and/or decreasing the number of bins.

In some implementations, the inventory holder 250 may be identified by a visual identifier 268 located on one or more sides of the inventory holder. The visual identifier 268 may be, for example, a barcode, bokode, QR code, color, shape, character, image, size, or any other identifier than can be used to identify the inventory holder. In some implementations, the visual identifier may identify the inventory holder, the side on which the visual identifier is located and/or the shelf on which the visual identifier is affixed. For example, the visual identifiers 268 may identify the inventory holder 250, that it is affixed to side-2 260, and that it is affixed to shelf 254. In some implementations, the visual identifiers may include multiple types of identification. For example, the visual identifiers may include both a barcode and human-readable information, similar to the visual identifiers discussed above with respect to FIG. 2A.

When the visual identifier is detected, it may be provided to the inventory management system 150 and information associated with the visual identifier may be obtained. For example, in some implementations, the configuration of the inventory holder, such as the shelf and/or bin configuration may be maintained and associated with the visual identifier. Likewise, stored bin content information may be maintained and associated with the visual identifier.

In some implementations, the separation of shelves and/or bins may be determined by processing one or more images of the inventory holder to identify the visual identifier, the edges of the inventory holder, the dividers included in the inventory holder, and/or the retention barriers of each shelf. For example, an image processing algorithm, such as an edge detection algorithm and/or an object detection algorithm, may be configured to identify the position of each edge of the inventory holder, each retention barrier 266 and each divider 210 and thereby determine the separation of bins within an inventory holder 250. This may be done alone or in conjunction with identifying the visual identifiers.

While the examples discussed herein utilize visual identifiers and/or dividers to detect and/or obtain information about inventory holders and bins, in other implementations other forms of identifiers may be utilized. For example, active identifiers, such as radio frequency identifier tags ("RFID") may be used to provide information about bins and/or inventory holders. In such an implementation, an active identifier reader may be utilized to detect the presence of active identifiers and to obtain information associated with the visual identifiers. Generally, the active identifier reader may utilize one or more wireless technologies (e.g., RFID, near field communication ("NFC"), Bluetooth, infrared) to detect active identifiers.

Figure 3A:
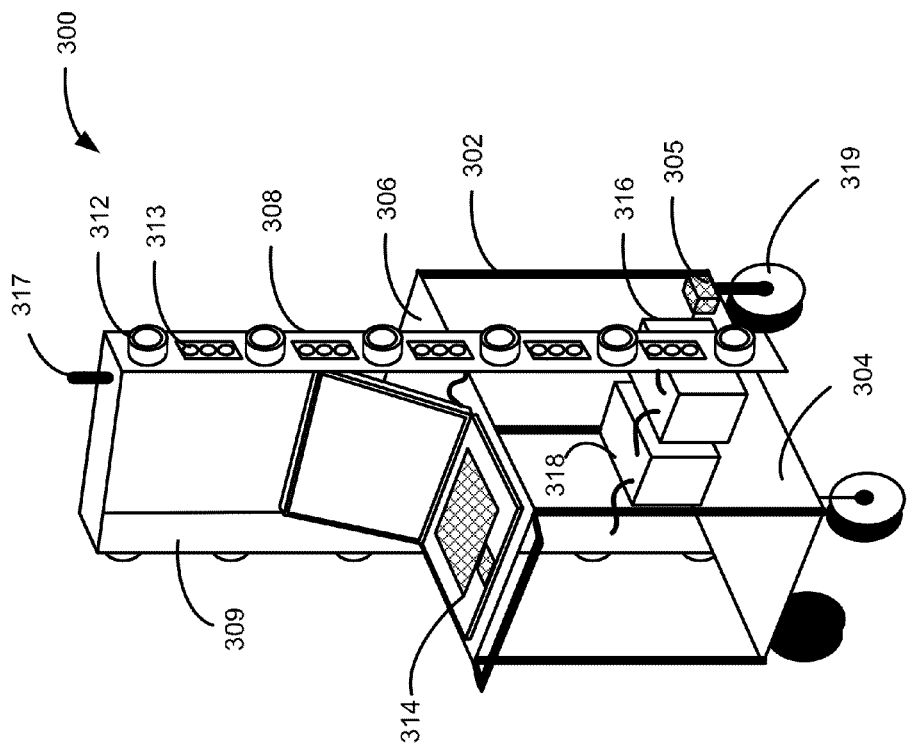
FIGS. 3A, 3B, 4A and 4B illustrate example bin content verification apparatuses, according to some implementations.

FIG. 3A illustrates an example BCV apparatus 300, according to some implementations. The BCV apparatus 300 may take many forms and the one provided in FIG. 3A is merely an example. In this example, the BCV apparatus includes a support frame 302 which may include one or more vertical supports, a base support surface 304 and an upper surface 306. The BCV apparatus 300 may also include a first side surface 308 coupled to the support frame and a second side surface 309 coupled to the support frame 302. The first side surface and the second side surface may be positioned opposite one another and coupled to side surfaces of the support frame 302 that are opposite one another. Mounted on the side surfaces are one or more image capture devices 312 positioned to capture images of bins as the BCV apparatus 300 passes by the bays. Also mounted on the side surfaces are one or more illumination elements 313, such as lights, that are positioned to illuminate the bins as the images are captured. By having image capture devices 312 and illumination elements 313 on opposite sides of the BCV apparatus 300, images of bins on either side of the BCV apparatus can be captured simultaneously. The BCV apparatus may also include one or more distance determining elements (not shown) configured to determine a distance between a bin and the BCV apparatus 300 as well as a position of the bin with respect to the BCV apparatus.

The image capture devices 312 may be still cameras, video cameras, or any other form of image capture device that can be utilized to capture one or more images. In some implementations, the image capture devices 312 may be positioned on a respective side surface such that the view angle of each image capture device 312 overlaps. By overlapping the view angle of each image capture device, the images may be combined and processed together such that the entire vertical direction of the bay can be imaged in a single pass, thereby capturing images of each bin and the corresponding content. Likewise, the image capture devices may be configured to capture images at a rate of speed or frequency that corresponds with the speed at which the BCV apparatus 300 is moving. For example, if the BCV apparatus is moving three miles per hour as it passes between two bays, the image capture devices 312 on each side of the BCV apparatus 300 capture images at a sufficient frequency such that all aspects of the bins are included in the series of captured images. In some implementations, the frequency of the image capture may be done such that the horizontal images overlap and when viewed together provide a full horizontal image of the bay.

In some implementations, the BCV apparatus 300 may include an encoder 305 that determines and/or controls the speed of the BCV apparatus 300. For example, the encoder 305 may include a speed control actuator that regulates to the speed of the apparatus so that the images are captured at a rate that corresponds with the speed of the apparatus. Likewise, the encoder may be utilized to determine a position of the apparatus within the materials handling facility. For example, the apparatus may be at a known position and as it moves the position of the apparatus may be maintained by the encoder. For example, the encoder may determine the rotations of a roller 319 on the apparatus and determine the distance traveled by the apparatus along with the direction of travel.

Through utilization of a series of image capture devices 312 mounted vertically and by capturing a series of images as the BCV apparatus 300 progresses down a row, the group of images may be utilized together and processed to provide a complete representation of each bin within the bay.

The BCV apparatus 300 may also include a computing system 314 that is in communication with the one or more image captures devices 312. The computing system 314 may be permanently part of the BCV apparatus 300, may be removably connected to the BCV apparatus 300, may be a remote computing system and/or a combination of both. The example of FIG. 3A shows the computing system in wired communication with the image capture devices. However, in other implementations, the computing system 314 may wirelessly communicate with the image capture devices 312. Likewise, the BCV apparatus 300 may also include a communication component 317, such as an antenna, that enables communication between the computing system 314 and a remote computing resource 310 (FIG. 1). As discussed in further detail below, the captured images may be processed by the computing system 314, by the remote computing resource 310 and/or by a combination thereof.

The computing system 314 may also be connected (wired and/or wireless) with one or more storage devices 316 that can be utilized to store images captured by the image capture devices 312 as the BCV apparatus 300 moves through the storage area 100. In some implementations, the storage device 316 may store images until a certain number of images and/or a defined size of images have been stored. Once reached, the images may be transmitted via the communication component 317 to a remote computing resource. In some implementations, images may be stored on the storage device 316 until all images of a bay have been captured. Once all images of a bay have been captured, the captured images may be transmitted to the inventory management system 150. In other implementations, images may be captured and stored on the storage device 316 until all images for a row have been captured. Once captured, the images for the row may be transmitted to the inventory management system 150. The images may be transmitted via the communication component 317 and/or the storage device 316 may be removed from the BCV apparatus 300 and connected to the remote computing resources.

The BCV apparatus 300 may also include one or more power supplies 318, such as a battery. The power supply 318 is configured to provide power to the image capture devices and/or the computing system 314 while the BCV apparatus 300 is moving throughout the storage area 100 of the materials handling facility. The BCV apparatus 300 may also include one or more rollers 319 or wheels that enable movement of the BCV apparatus throughout the materials handling facility.

Figure 3B:
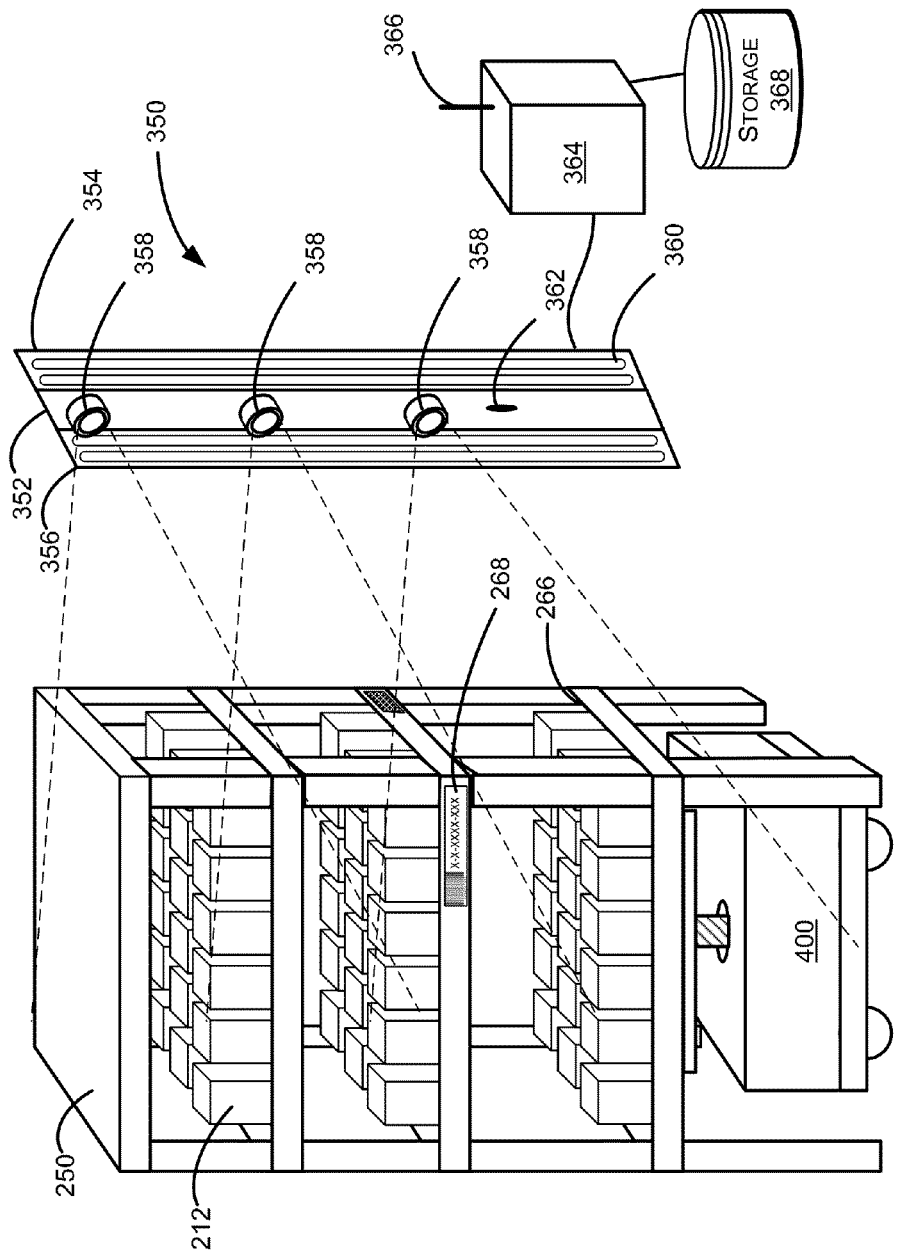

FIG. 3B illustrates another example BCV apparatus 350, according to some implementations. In this example, the BCV apparatus 350 is maintained at a fixed location and captures images of inventory holders (bays) as they are transported past the BCV apparatus 350. In this example, the BCV apparatus 350 includes an imaging column 352 and two illumination columns 354, 356. The imaging column may include one or more image capture devices 358, such as cameras that are configured to capture images of an inventory holder 250 as it is transported past the BCV apparatus 350 by a mobile drive unit 400. Each image capture device 358 may be angled downward so that the field of view is directed down into the shelves of the inventory holder at an angle, thereby allowing imaging of items 212 in the inventory holder 250 that may otherwise be obscured by a retention barrier 266 of the inventory holder 250.

Each of the illumination columns 354, 356 may include one or more illumination elements 360, such as lights, that are positioned to illuminate the bins of the inventory holder 250 as the images are captured. The BCV apparatus may also include one or more distance determining elements 362 such as ranging lasers, proximity sensors, ultrasonic sensors, etc., configured to determine a distance between the inventory holder 250 and the BCV apparatus 350 as well as a position of the bin with respect to the BCV apparatus. The distance determining elements 362 may be configured to cause the illumination elements 360 to illuminate the inventory holder 250 when the inventory holder 250 reaches a first defined distance from the BCV apparatus 350 and cause the image capture devices 358 to capture one or more images of the inventory holder 250 when the inventory holder 250 is a second defined distance from the BCV apparatus 350. The first defined distance and the second defined distance may be the same defined distance or different. For example, the first defined distance may be 10 feet and the second defined distance may be 8 feet.

In another implementation, the depth of the field of view of one or more of the image capture devices 358 may be fixed and a sensor may monitor the field of view for a visual identifier 268 included on the inventory holder 250. When the visual identifier 268 enters the field of view, the sensor may cause the illumination elements 360 to illuminate and when the visual identifier comes into focus in the field of view, the sensor may cause the image capture devices 358 to capture one or more images of the inventory holder 250. By fixing the field of view of the image capture devices and capturing images when the visual identifier of the inventory holder is in focus, the inventory holders will be at approximately the same distance from the BCV apparatus 350 when imaged.

In still another implementation, a load cell, scale, or other pressure sensor may be included on and/or in the floor of the materials handling system at a defined distance from the BCV apparatus 350. In such an implementation, when a mobile drive unit 400 carrying an inventory holder 250 passes over the pressure sensor, the pressure sensor may instruct the BCV apparatus 350 to illuminate the illumination elements 360 and capture one or more images of the inventory holder 250.

The BCV apparatus 350 may also include a computing system 364 that is in communication with the one or more image captures devices 358, the illumination elements 360 and/or the distance determining element 362. The computing system 364 may be permanently part of the BCV apparatus 350, may be removably connected to the BCV apparatus 350, may be a remote computing system that connects to the BCV apparatus 350 through a network and/or a combination thereof. The example of FIG. 3B shows the computing system in wired communication with the image capture devices 358. However, in other implementations, the computing system 364 may wirelessly communicate with the image capture devices 358. Likewise, the BCV apparatus 350 may also include a communication component 366, such as an antenna, that enables communication between the computing system 364 and a remote computing resource 310 (FIG. 1). As discussed in further detail below, the captured images may be processed by the computing system 364, by the remote computing resource 310 and/or by a combination thereof.

The computing system 364 may also be connected (wired and/or wireless) and/or include one or more storage devices 368 that can be utilized to store images captured by the image capture devices 358. In some implementations, the storage device 368 may store images until a certain number of images and/or a defined size of images have been stored and/or until a defined number of inventory holders have been imaged. Once reached, the images may be transmitted via the communication component 366 to a remote computing resource. Images may be transmitted via the communication component 366 and/or the storage device 368 may be removed from the BCV apparatus 350 and connected to the remote computing resources.

The BCV apparatus 350 may be positioned at any location within a material handling facility. For example, the BCV apparatus may be positioned near an operating location, a storage area, or any other location in which mobile drive units 400 may transport an inventory holder past the BCV apparatus.

Figure 4B:
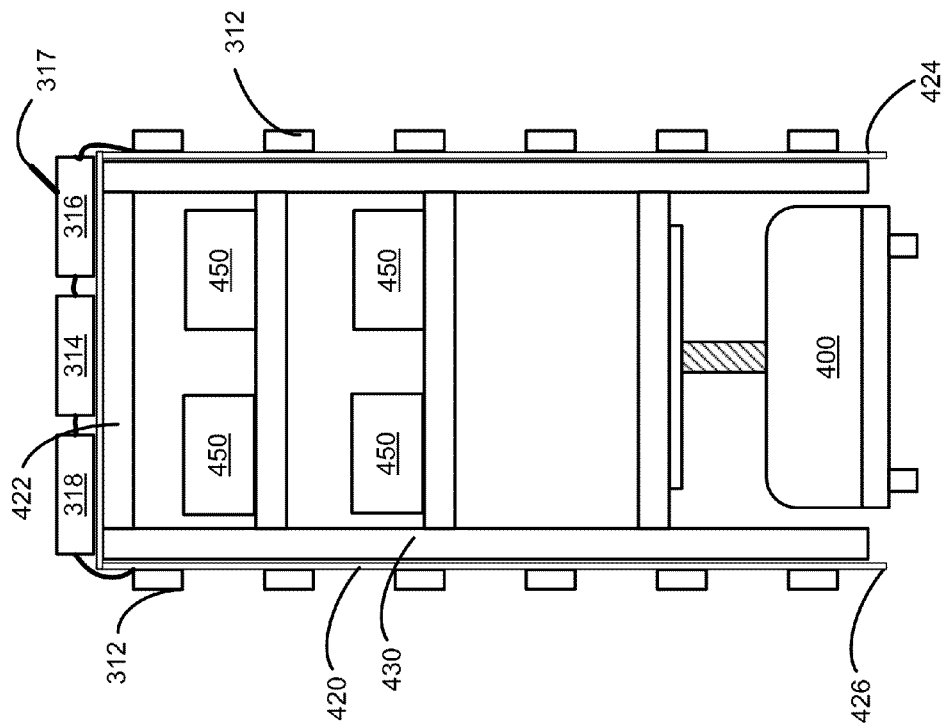
Figure 4A:
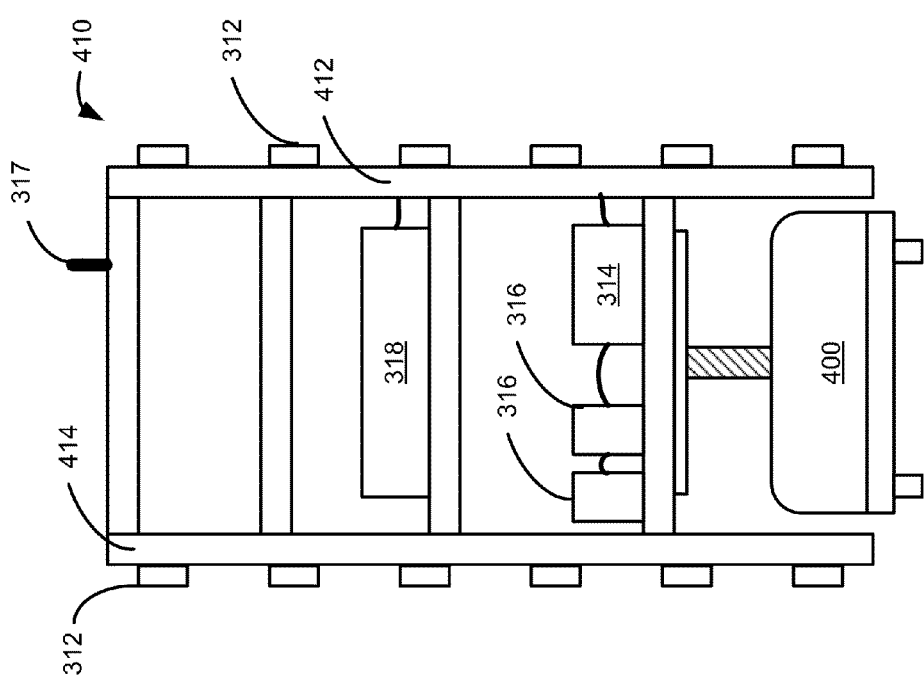

FIGS. 4A and 4B illustrate still other examples of BCV apparatuses 410, 420, according to other implementations. The examples of FIGS. 4A and 4B are similar to that of the BCV apparatus 300 (FIG. 3A) but are configured to be retrieved by and removably coupled with a mobile drive unit 400, such as a Kiva mobile drive unit. Turning first to FIG. 4A, the BCV apparatus 410 may be configured such that the mobile drive unit 400 can position itself under the BCV apparatus 410, lift the BCV apparatus 410 off the ground and move the BCV apparatus under power of the mobile drive unit 400. In this example, the BCV apparatus 410 may have two side surfaces 412, 414 positioned opposite one another and separated a distance sufficient to allow the mobile drive unit 400 to position itself under the BCV apparatus 410. The BCV apparatus 410 may also include a series of shelves or horizontal support members and the computing system 314, storage devices 316 and/or power supply 318 may be located on those horizontal support members. The mobile drive unit 400 may lift the BCV apparatus 410 by positioning itself under the horizontal support member, engaging the horizontal support member and lifting the BCV apparatus 410. As with the BCV apparatus 300 (FIG. 3), the BCV apparatus 410 includes one or more image capture devices 312 mounted on opposite side surfaces of the BCV apparatus 410.

Turning now to FIG. 4B, in this example the BCV apparatus 420 is configured as a frame that may be supported by an inventory holder 430 that is lifted and propelled by a mobile drive unit 400. In this example the BCV apparatus 420 is separate from the inventory holder 430. In this configuration, the horizontal support member 422 is at the top of the BCV apparatus 420 and the vertical side surfaces 424, 426 are longer than the vertical side surfaces of the inventory holder 430. The vertical side surfaces each include one or more image capture devices 312.

With this configuration, the mobile drive unit 400 may carry an inventory holder that contains one or more items of inventory 450 and position itself and the inventory holder 430 under the BCV apparatus 420. Once positioned under the BCV apparatus 420, the mobile drive unit 400 may raise the height of the inventory holder 430 such that the top of the inventory holder 430 engages with the horizontal support member 422 and lifts the BCV apparatus 420 off the floor. The mobile drive unit may then proceed through the storage area with both the inventory holder 430 that may contain inventory 450 and the BCV apparatus 420.

Like the other BCV apparatuses discussed herein, the BCV apparatus 420, may include a computing system 314, storage device 316, power supply 318 and/or a communication component 317. In this example, the computing system 314, storage device 316, power supply 318 and communication component 317 are positioned above and mounted to the horizontal support member.

In some instances, the BCV apparatus 300, 350, 410, 420 may operate in conjunction with or may otherwise utilize or communicate with one or more components of the inventory management system 150. Likewise, components of the inventory management system 150 may interact and communicate with the BCV apparatus 300, 350, 410, 420 and/or communicate with other components of the storage area 100.

Figure 5:
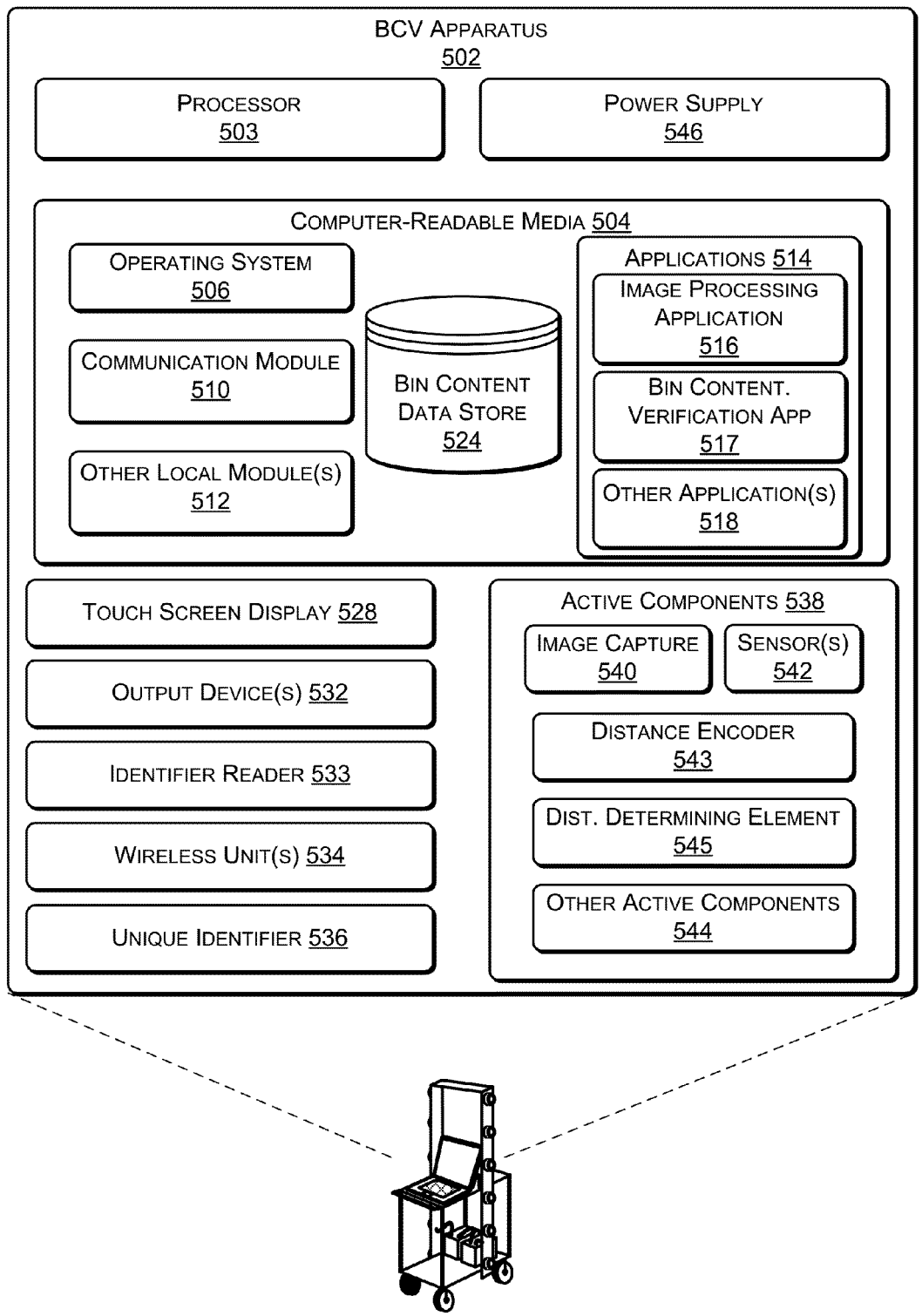
FIG. 5 illustrates example functional components of a bin content verification apparatus, such as those illustrated in FIGS. 3A-4B, according to some implementations.

FIG. 5 illustrates example functional components of a BCV apparatus 502, such as those illustrated in FIGS. 3A, 3B, 4A and 4B, according to some implementations. The functional components of the BCV apparatus 502 include one or more processors 503 and computer-readable media 504. The computer-readable media 504 may include volatile and non-volatile memory, removable and non-removable media implemented in any method or technology for storage of information, such as computer-readable instructions, data structures, and/or program modules. Such memory includes, but is not limited to, RAM, ROM, EEPROM, flash memory or other memory technology. The computer-readable media 504 may be implemented as computer-readable storage media ("CRSM"), which may be any available physical media accessible by the processor(s) 503 to execute instructions stored on the media 504. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 503.

Several modules such as instruction, data stores, and so forth may be stored within the computer-readable media 504 and configured to execute on the processor(s) 503. A few example functional modules are shown stored in the computer-readable media 504, although the same functionality may alternatively be implemented in hardware, firmware, or as a system on a chip (SOC).

An operating system module 506 may be configured to manage hardware and services within and coupled to the BCV apparatus 502 for the benefit of other modules. A communication module 510 facilitates communication, such as cellular communication, RF communication, Wi-Fi communication, Bluetooth communication, NFC, satellite-based communication, and so forth. For example, the communication module 510 may facilitate communication with the inventory management system 150 via a network or over another wired and/or wireless communication path. Likewise, the communication module 510 may facilitate communication and detection of bay identifiers, bin identifiers and/or bay configuration information. Other local modules 512 may also be present on the BCV apparatus 502, depending upon the implementation and configuration of the BCV apparatus 502.

The BCV apparatus 502 may also include a plurality of applications 514 stored in the computer-readable media 504 or otherwise accessible to the BCV apparatus 502. In this implementation, the applications 514 include an image processing application 516, a bin content verification application 517, and other applications 518. However, the BCV apparatus 502 may include any number or type of applications and is not limited to the specific examples shown here. Likewise, in some implementations, one or more of the applications may reside and be performed by a remote computing resource 310, such as the inventory management system 150. For example, the image processing application 516 and/or the bin content verification application 517 may reside in memory of the remote computing resource(s) 310 and be controlled or operated by the inventory management system 150 in response to receiving images from the BCV apparatus.

Regardless, of location, the image processing application 516 may facilitate the correlation and/or processing of images captured by the imaging components of the BCV apparatus to detect visual identifiers and/or generate feature vectors, as discussed further below.

Data stores may also be stored locally on the media 504, including a bin content data store 524. The bin content data store 524 may contain stored bin content information and/or feature vectors representative of items expected to be included in the bins to be images. The stored bin content information and the current bin content information obtained from the image processing application 516 may be utilized by the bin content verification application 517 to determine if there is a difference between the stored bin content information and the current bin content information.

The BCV apparatus 502 may also include a display, such as a touch screen display 528, as well as other input devices, like a keypad, control buttons, microphones, motion detection components, position determining components, etc. Output devices 532 may include a display, an illumination element (e.g., LED), a vibrator to create haptic sensations, microphone(s) or the like. The BCV apparatus 502 might include a wireless unit 534 coupled to another antenna to facilitate a wireless connection to one or more networks. The wireless unit 534 may implement one or more of various wireless technologies, such as Wi-Fi, Bluetooth, RF, and so on.

The BCV apparatus 502 may also include an embedded unique identifier 536. The unique identifier may be embedded into a memory of the BCV apparatus 502 or otherwise stored and accessible by the BCV apparatus 502 and/or the inventory management system 150.

The BCV apparatus 502 may also be equipped with multiple active components 538. Any number of components may be used. Representative components include image capture component 540, sensors 542, a distance encoder 543, a distance determining element 545, and other active components 544. The active components 538 may provide additional information relating to the BCV apparatus and/or images captured by the BCV apparatus. For example, the distance encoder 543 may be coupled to a wheel of the apparatus, measure the distance traveled by the BCV apparatus 502 and/or the position/direction of the apparatus based on the rotation of the wheels. This information may be time stamped and/or otherwise correlated with the images as they are captured to assist in determining the bins represented in the captured images. Likewise, the distance encoder 543 may control or limit the speed of travel of the apparatus as it is capturing images.

The distance determining element 545 may be configured to determine a distance between the BCV apparatus and the bays and/or inventory holder. The distance determining element may be, for example, a distance sensor, ranging laser, ultrasonic etc. This distance information may be used to assist in guiding the BCV apparatus so that it is a known distance from the bays as the images are captured. Alternatively, or in addition thereto, the distance determining elements may be used to adjust the focal length of the image capture devices so that even if the BCV apparatus is at a different distance from the bays, the focal length adjustment will account for the different distances. In implementations where the BCV apparatus is stationary, the distance determining elements 545 may be configured to initiate the illumination of the illumination elements and to cause the image capture devices to capture images of bays when the bays are a defined distance from the BCV apparatus. For example, a defined distance (e.g., 8 feet) may be established and as a mobile drive unit approaches an operating location, the distance determining elements 545 will detect the mobile drive unit carrying a bay (inventory holder). When the bay is approximately 8 feet from the BCV apparatus located at or near the operating location, the distance determining elements will cause the illumination elements to illuminate and cause the image capture devices to capture one or more images of the bay.

The BCV apparatus 502 may also include some form of power supply 546, such as a battery, solar power, or other form of power supply for providing power to the BCV apparatus 502 and its components during operation. Likewise, a synchronized clock (not shown) or other synchronization mechanism may be included. The clock may be used to provide time stamp information that is associated with each captured image and the distance encoder information. By utilizing the clock or other synchronization mechanism, the distance encoder information and the captured images may be correlated based on the time stamps.

While the functional components of the example BCV apparatus 502 are discussed herein as part of the BCV apparatus 502, in other implementations, one or more of the functional components may be distributed throughout the materials handling facility and/or implemented as part of the inventory management system 150. For example, one or more of the applications, such as the image processing application 516, may be implemented as part of the inventory management system 150. In such an example, when images of a bay are captured, they may be provided to the inventory management system for processing.

Figure 6:
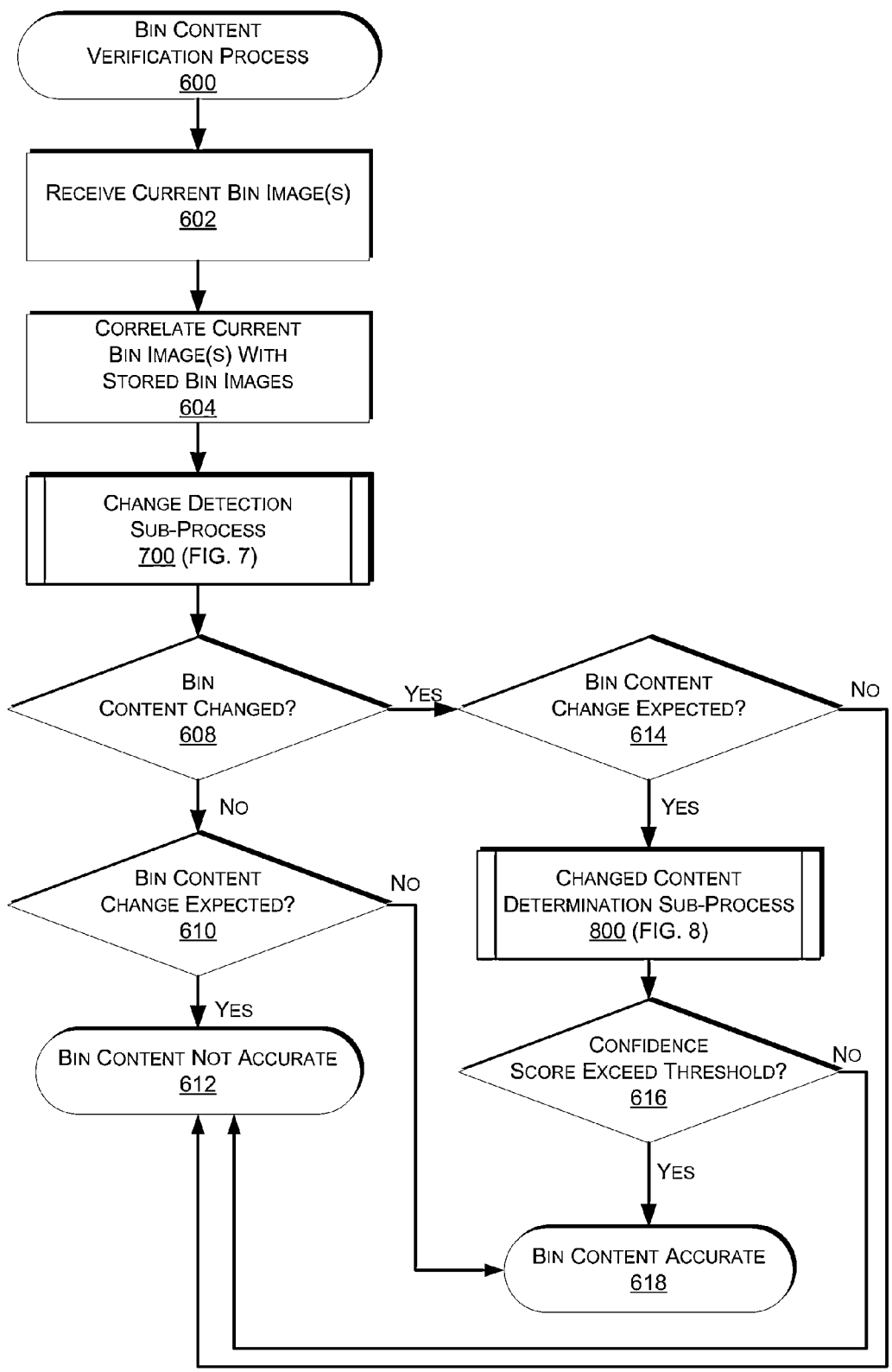
FIG. 6 depicts a flow diagram of a bin content verification process, according to some implementations.

FIG. 6 depicts a flow diagram of an example bin content verification process 600 for identifying the addition and/or removal of item(s) from a tote, according to some implementations. The example process 600 may be implemented with any of the BCV apparatus configurations discussed above. The process of FIG. 6 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 600 begins by receiving one or more images of a bin, as in 602. As discussed above, a BCV apparatus may be pushed, pulled, carried or otherwise moved past a bin within a materials handling facility. Alternatively, the BCV apparatus may be stationary and the bay or inventory holder may be moved past or into the field of view of an imaging element on the BCV apparatus. As the BCV apparatus moves past the bin or the inventory holder moves past the BCV apparatus, one or more images are captured and provided to the example process 600. In some implementations, the example process may also receive from the BCV apparatus location and/or time stamp information identifying the location of the BCV apparatus and timing regarding the location of the BCV apparatus when the images were captured. As an alternative, or in addition thereto, other forms of location information may be provided by the BCV apparatus. For example, indoor position information may be obtained and provided with the captured images.

As images are received, the images are processed to determine the bins. For example, based on the location information, time information, etc., it may be determined what bay and/or inventory holder is represented in the captured image. For example, if location information of the BCV apparatus, or time information corresponding to the time the inventory holder was captured, is provided along with a captured image, the bay in the field of view of the BCV apparatus may be determined. For example, the inventory management system may maintain information as to the location of each inventory holder at any point in time. Based on the time information received with a captured image, the inventory management system can determine the inventory holder that was moving past the BCV apparatus at that time, and thus represented in the image.

Upon identifying the bay (inventory holder), the example process may determine a stored configuration of the bay (e.g., shelf and/or bin configuration). Likewise, additional processing may be performed on the captured images using object and/or edge detection to determine the edges of the inventory holder, the retention barriers (for mobile inventory holders), visual identifiers for each bay and/or dividers that are included in the image. Based on the processed image and the stored bay information, the portions of the image that include representations of bins and content within the bins are determined.

For each determined bin image, referred to herein as current bin images, those images are correlated with stored bin images for the determined bin, as in 604. Stored bin images are images of a bin that were previously captured, associated with the bin and stored in the bin configuration data store. For example, the example process 600 may be performed periodically (e.g., nightly) and current bin images may be captured and stored in the bin configuration data store. When those current bin images are stored they become stored bin images and may be used for comparison during subsequent execution of the example process 600.

To correlate the bin images, the bin represented in the current bin image is determined and associated with the current bin image. The bin may be identified based on, for example, the location information provided by the BCV apparatus with the current bin image and/or by processing the image to identify one or more bin and/or bay identifiers. For example, as discussed above, bin identifiers and/or bay identifiers may be included in the current bin image. Object and/or character recognition algorithms may be utilized to identify the bin identifiers and/or bay identifiers and used to identify the bin represented in the image.

Utilizing the correlated current bin image(s) and the stored bin image(s) the change detection sub-process may be performed, as in 700. The change detection sub-process is discussed in more detail below with respect to FIG. 7.

Based on the results of the change detection sub-process 700, a determination is made as to whether the content of the bin has changed, as in 608. Bin content may change, for example, if an item of content is added to the bin or if an item of content is removed from the bin.

If it is determined that the bin content has changed, a determination is made as to whether the bin content was expected to change, as in 614. For example, if the inventory management system provided an instruction to an agent to pick an item from the content of the bin and that pick was to occur after the time that the stored bin image was captured but before the time that the current bin image was captured, it is determined that a change to the content was expected to occur. Likewise, if the inventory management system provided an instruction to an agent to stow an item in the bin and that stow was to occur after the time that the stored bin image was captured but before the time that the current bin image was captured, it is determined that a change to the content was expected to occur.

If it is determined that the bin content was expected to change, the changed content determination sub-process is performed, as in 800. The changed content determination sub-process determines if the actual change to the content of the bin corresponds with the expected change to the content of the bin. The example changed content determination sub-process is discussed in more detail below with respect to FIG. 8.

The changed content determination sub-process 800 returns a confidence score identifying a confidence level as to whether the actual change to the bin content corresponds with the expected change to the bin content. Based on the confidence score, a determination is made as to whether the confidence score exceeds a confidence threshold, as in 616. The confidence threshold may be any defined score for determining if the actual change to the bin content corresponds with the expected change to the bin content. For example, the confidence threshold may be defined at 95% such that the confidence score must be higher than 95% before the example process will determine that the actual change to the bin content corresponds to the expected change of the bin content.

If it is determined that the confidence threshold has been exceeded by the confidence score, the bin content is considered accurate and not in need of review by an agent, as in 618. However, if it is determined that the confidence threshold is not exceeded, or if it is determined at decision block 614 that the bin content was not expected to change, it is determined that the bin content is considered not accurate and an agent is scheduled to review the content of the bin, as in 612. In some implementations, an agent may review the current bin images and/or the stored bin images to determine if the bin content is accurate. In another implementation, the agent may physically view the bin content.

Returning to decision block 608, if it is determined that the bin content did not change, a determination is made as to whether the bin content was expected to change, as in 610. If it is determined that the bin content was expected to change, it is determined that the bin content is not accurate and an agent is instructed to review the bin content, as in 612. However, if it is determined that the bin content was not expected to change, it is determined that the bin content is accurate and agent review of the bin is not needed, as in 618.

Figure 7:
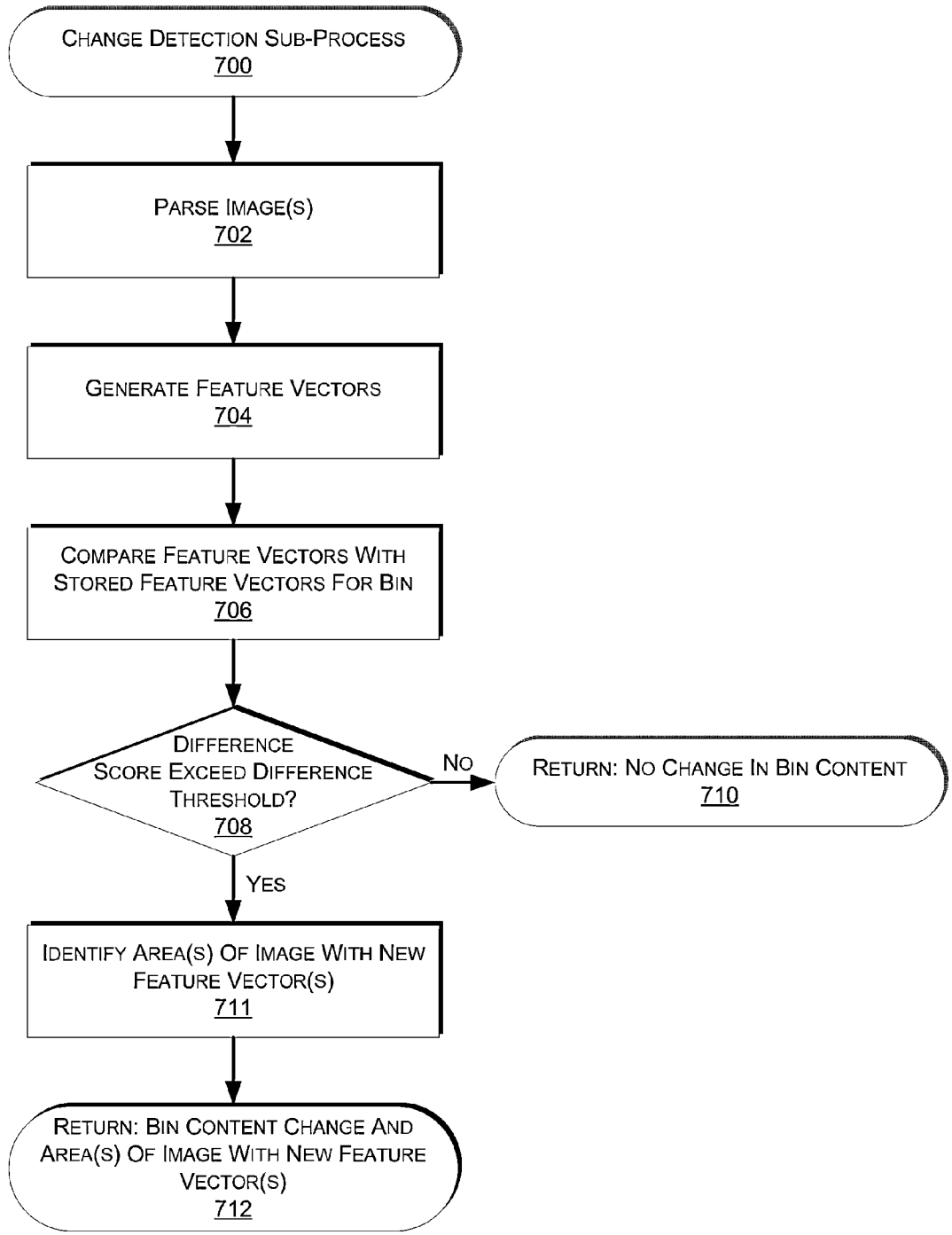
FIG. 7 depicts a flow diagram of a change detection sub-process for determining if a change to content included in a bin has occurred, according to some implementations.

FIG. 7 depicts a flow diagram of a change detection sub-process 700 for determining if a change to content included in a bin has occurred, according to some implementations. The example sub-process begins by parsing the current bin image(s) into segments or other divisible units, generally referred to herein as cells, as in 702. For example, each pixel of an image may be parsed using a 5×5 grid pattern. For each grid pattern, a feature vector representative of the colors, shapes, etc. included in the grid is generated, as in 704. In some implementations, edge detection, scale-invariant feature transformation (SIFT), object detection, color detection, and/or other techniques may be used to generate feature vectors for an image.

Once feature vectors for each grid pattern of the image are generated, the features vectors of the current bin image are compared to feature vectors of the stored bin image to generate a difference score, as in 706. In some implementations, the feature vectors of the stored bin image may be stored with the bin image. In other implementations, the feature vectors of the stored bin image may be generated during generation of the feature vectors of the current bin image. By parsing images into multiple cells or grid patterns, generating feature vectors and comparing those feature vectors, content items may be moved around within the bin and the features vectors can still be matched between images. Accordingly, movement of content items within the bin will not result in the detection of new feature vectors.

The difference score may be high if new feature vectors are detected as a result of an item being added to the bin and/or as a result of an item being removed from the bin. For example, if an item is added to the bin, the pixels of the image that represent that item of content will generate feature vectors that do not correspond with any of the feature vectors of the stored bin image, thereby resulting in a high difference score. Likewise, if an item is removed, the empty space will result in feature vectors that are not generated by the stored bin images, again resulting in a high difference score when the feature vectors of the images are compared.

In other implementations, it may also be determined if there are feature vectors of the stored bin image that are not generated from the current bin image. Identifying feature vectors of the stored bin image that are not generated from the current bin image is another way to determine if an item has been added and/or removed. For example, if an item is removed, the feature vectors generated from the pixels of the stored bin image that represented the content item will not be included in the feature vectors generated from the current bin image. The difference score may be representative of the difference between all feature vectors of the current bin image compared to all the feature vectors of the stored bin image.

After generating a difference score, a determination is made as to whether the difference score exceeds a difference threshold, as in 708. The difference threshold may be any defined score that, if exceeded, determines that the content of the bin has changed. The difference threshold may vary for different bins, different items, different locations within the materials handling facility, different days, different times of year, etc.

If it is determined that the difference score does not exceed the difference threshold, the example sub-process 700 returns a notification that the bin content has not changed, as in 710. However, if it determined that the difference score does exceed the difference threshold, an area of the image with the new feature vectors is identified, as in 711. For example, if an item is added to the bin, it will be represented by the pixels that generated feature vectors that are not included in the stored bin image. This section of the image is identified as the area of the image that includes the new feature vectors. To further illustrate, in some implementations, the feature vectors representative of a grid pattern of a pixel of the current bin image may be compared with the feature vectors of a corresponding pixel of the stored bin image to determine a pixel difference score. Similar to the above, it may be determined whether the pixel difference score exceeds a pixel difference threshold. The pixel difference threshold may be any defined score that, if exceeded, determines that the content of the bin has changed. The pixel difference threshold may vary for different bins, different items, different locations within the materials handling facility, different days, different times of year, difference segments of a current bin image, etc.

If the pixel difference score exceeds the pixel difference threshold, it may be determined that the information represented by that pixel has changed between the current bin image and the stored bin image. This comparison may be done for each pixel of the current bin image to determine which areas of the current bin image have changed.

The example sub-process 700 returns a notification that the bin content has changed and an identification of the area of the image with new feature vectors, as in 712. In some implementations, the example sub-process 700 may not determine the area(s) of the image that have changed and may only return a notification that the bin content represented in the current bin image has changed.

Figure 8:
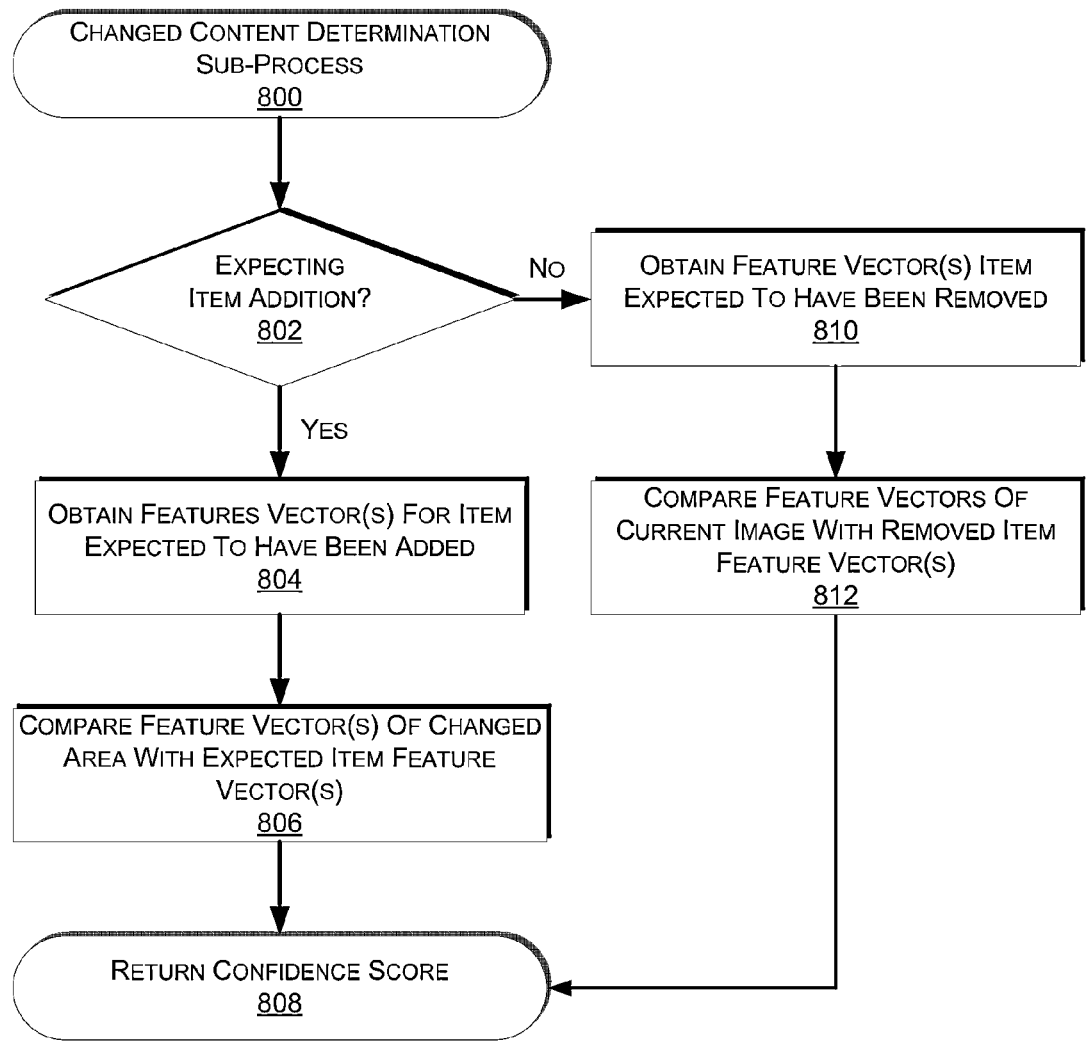
FIG. 8 depicts a flow diagram of a changed content determination sub-process for determining if the actual change to content of a bin content corresponds to an expected change to content included in a bin, according to some implementations.

FIG. 8 depicts a flow diagram of a changed content determination sub-process 800 for determining if the actual change to content of a bin corresponds to an expected change to content included in a bin, according to some implementations. The example sub-process 800 begins by determining if an item addition was expected for the bin, as in 802. If it is determined that an item addition was expected, feature vectors representative of the item expected to have been added are obtained, as in 804. For example, the inventory management system may maintain feature vectors for each item of inventory and may provide that information to the example sub-process 800. In some implementations, as items are added to the storage area of the materials handling facility, multiple images of the item may be captured (e.g., images of each side of the items). Those images may be parsed and feature vectors generated and stored for each segment.

The features vectors of the changed area of the bin image and the expected item feature vectors are then compared, as in 806. Based on the comparison of the feature vectors, a confidence score is generated based on the similarity of the feature vectors. For example, if the feature vectors match, or are very close to matching, a high confidence score is provided. If there are multiple stored images of the item expected to have been added, the features vectors for each image may be compared with the feature vectors from the area of the image that has changed and the highest correlation used to generate the confidence score. The generated confidence score is returned, as in 808.

Returning to decision block 802, if it is determined that an item addition was not expected, feature vectors of the item expected to have been removed from the bin are obtained, as in 810. As discussed above, feature vectors representative of an item may be maintained by the inventory management system and provided to the example sub-process 800. The features vectors of the current image may then be compared with the feature vectors of the image to determine if those feature vectors are present in the current bin image, as in 812. Based on a comparison of the feature vectors, a confidence score is determined and returned, as in 808. In this instance, the confidence score is representative of the confidence that the expected item was actually removed from the bin.

Figure 9:
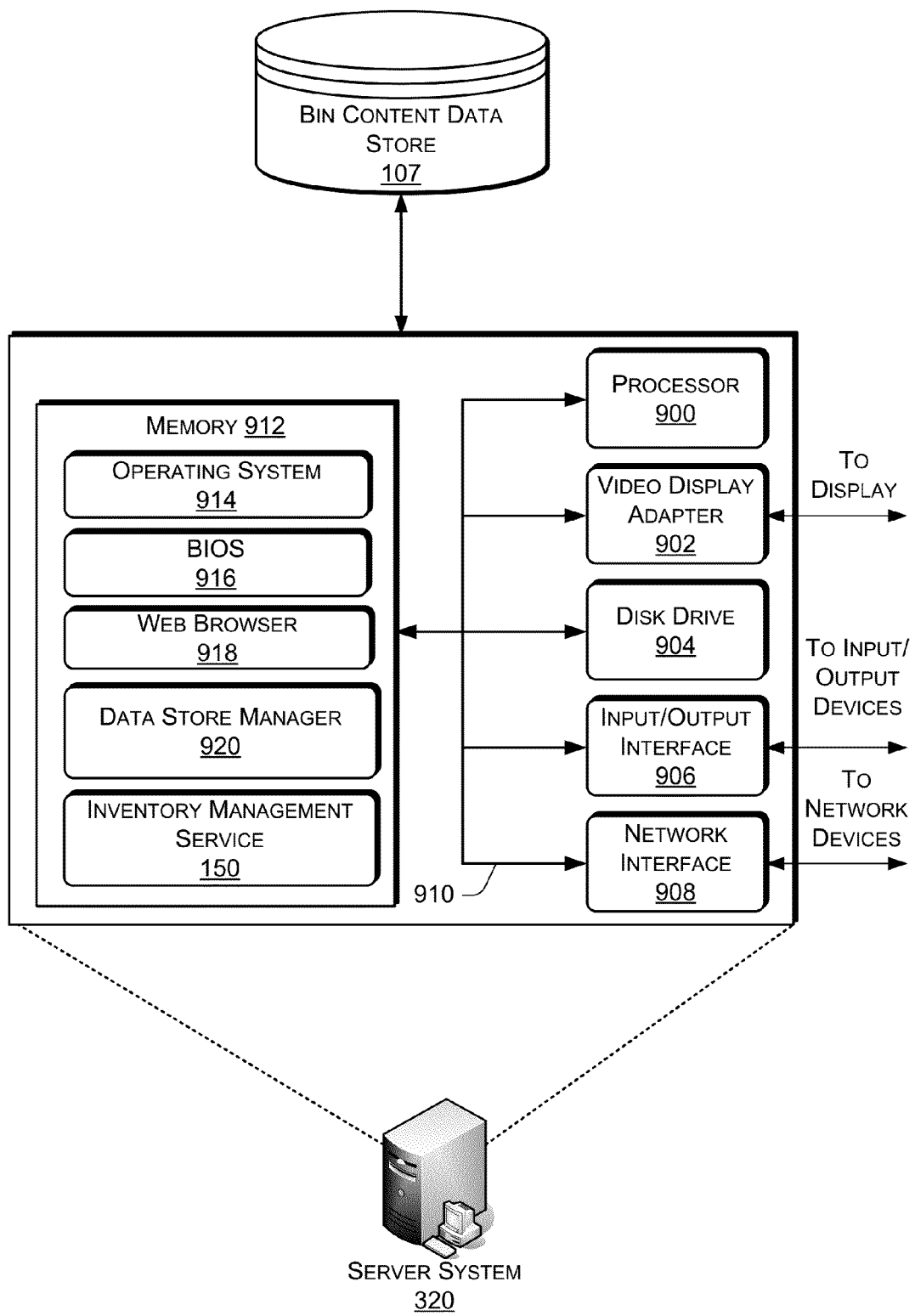
FIG. 9 is a block diagram of an illustrative implementation of a server system that may be used with various implementations.

FIG. 9 is a pictorial diagram of an illustrative implementation of a server system, such as the server system 320, that may be used in the implementations described herein. The server system 320 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an agent of the server system 320 to monitor and configure operation of the server system 320 and/or to resolve differences between stored bin content information and current bin content information received from images captured by a BCV apparatus. The input/output interface 906 likewise communicates with external input/output devices not shown in FIG. 9, such as a mouse, keyboard, scanner, or other input and output devices that can be operated by an agent of the server system 320. The network interface 908 includes hardware, software, or any combination thereof, to communicate with other computing devices. For example, the network interface 908 may be configured to provide communications between the server system 320 and other computing devices, such as the BCV apparatus, via a network.

The memory 912 generally comprises random access memory (RAM), read-only memory (ROM), flash memory, and/or other volatile or permanent memory. The memory 912 is shown storing an operating system 914 for controlling the operation of the server system 320. A binary input/output system (BIOS) 916 for controlling the low-level operation of the server system 320 is also stored in the memory 912.

The memory 912 additionally stores program code and data for providing network services to the BCV apparatus and/or the inventory management system 150. Accordingly, the memory 912 may store a browser application 918. The browser application 918 comprises computer executable instructions, that, when executed by the processor 900, generate or otherwise obtain configurable markup documents such as Web pages. The browser application 918 communicates with a data store manager application 920 to facilitate data exchange between the bin content data store 107 and the inventory management system 150.

As used herein, the term "data store" refers to any device or combination of devices capable of storing, accessing and retrieving data, which may include any combination and number of data servers, databases, data storage devices and data storage media, in any standard, distributed or clustered environment. The server system 320 can include any appropriate hardware and software for integrating with the data store 107 as needed to execute aspects of one or more applications for the BCV apparatus 300, and/or the inventory management system 150.

The data store 107 can include several separate data tables, databases or other data storage mechanisms and media for storing data relating to a particular aspect. For example, the data store 107 illustrated includes mechanisms for maintaining inventory information, bay location information, bin content information, images of the bay, etc., which can be used to generate and deliver information to BCV apparatuses, the inventory management system 150 and/or agents.

It should be understood that there can be many other aspects that may be stored in the data store 107 and that additional data stores beyond the one illustrated may be included. The data store 107 is operable, through logic associated therewith, to receive instructions from the server system 320 and obtain, update or otherwise process data in response thereto.

The memory 912 may also include the inventory management system 150, discussed above. The inventory management system 150 may be executable by the processor 900 to implement one or more of the functions of the server system 320. In one implementation, the inventory management system 150 may represent instructions embodied in one or more software programs stored in the memory 912. In another implementation, the inventory management system 150 can represent hardware, software instructions, or a combination thereof.

The server system 320, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method for verifying content of a bin at a location within a materials handling facility, comprising:
   under control of one or more computing systems configured with executable instructions,
   receiving a current bin image that includes a first representation of the bin and a first representation of content included in the bin;
   determining a stored bin image, wherein the stored bin image includes a second representation of the bin and a second representation of content included in the bin;

processing the current bin image and the stored bin image to determine that a content change has occurred with respect to the content in the bin;

determining an area of the current bin image corresponding to the determined content change;

determining a confidence score representative of a confidence that the determined content change corresponds to an expected content change; and determining that the content included in the bin is accurate based at least in part on the confidence score exceeding a confidence threshold.

2. The computer-implemented method of claim 1, wherein processing the current bin image and the stored bin image further includes:

determining that the content included in the bin is not accurate based at least in part on the confidence score not exceeding the confidence threshold.

3. The computer-implemented method of claim 1, wherein processing the current bin image and the stored bin image further includes:

generating at least one feature vector representative of the current bin image;

comparing the at least one feature vector with a stored feature vector representative of at least a portion of the stored bin image; and determining that the content has changed based at least in part on the comparison of the at least one feature vector and the stored feature vector.

4. The computer-implemented method of claim 1, further comprising:

generating a plurality of feature vectors, each of the plurality of feature vectors representative of a respective portion of the current bin image;

comparing each of the plurality of feature vectors with a plurality of stored feature vectors of the stored bin image to generate a difference score, wherein the difference score represents a difference between the current bin image and the stored bin image;

determining that the difference score exceeds a difference threshold; and based at least in part on the determination that the difference score exceeds the difference threshold, determining that the content included in the bin has changed.

5. The computer-implemented method of claim 1, wherein determining a confidence score further includes:

generating a feature vector representative of the area of the current bin image corresponding to the determined content change;

determining a stored feature vector representative of an item expected to have been added to the bin; and determining a confidence score based at least in part on a comparison of the feature vector and the stored feature vector.

6. The computer-implemented method of claim 1, wherein determining a confidence score further includes:

generating a plurality of feature vectors, each of the plurality of feature vectors representative of a respective portion of the current bin image;

determining a stored feature vector representative of an item expected to have been removed from the bin; and determining a confidence score based at least in part on a comparison of the plurality of feature vectors and the stored feature vector.

7. A system for verifying content included in a bin, the system comprising:

an apparatus, including:

an image capture device oriented to capture an image of a bin located at a bay as the apparatus moves past the bay;

a power supply connected to the image capture device and configured to provide power to the image capture device;

an encoder configured to determine position information representative of a position of the apparatus as the apparatus moves;

a storage component in communication with the image capture device and the encoder, wherein the storage component is configured to store the image and the position information representative of a position of the apparatus at a time when the image was captured; and a computing system, including:

one or more processors; and a memory coupled to the one or more processors and storing program instructions that when executed by the one or more processors cause the one or more processors to at least:

receive from the storage component the image of the bin and the position information;

correlate the image of the bin with a stored image of the bin;

determine, based at least in part on the image and the stored image, if at least one item of content included in the bin has changed;

determine if a change to the content included in the bin was expected; and determine, based at least in part on the determination of whether at least one item of content included in the bin has changed and based at least in part on whether the change to the content included in the bin was expected, whether the content included in the bin is accurate.

8. The system as recited in claim 7, wherein the expected change is at least one of an item removal from the bin or an item addition to the bin.

9. The system as recited in claim 7, wherein:

the computing system is remote from the apparatus; and the storage component is configured to be removed from the apparatus and connected to the computing system.

10. The system as recited in claim 7, wherein:

the computing system is remote from the apparatus; and the apparatus includes a communication component configured to enable communication between the apparatus and the computing system; and the computing system receives the image of the bin and the position information from the communication component.

11. The system as recited in claim 7, wherein:

the bin is determined based at least in part on a configuration of the bay; and the configuration of the bay is determined based at least in part on an identification of a visual identifier included in the image.

12. The system as recited in claim 11, wherein the visual identifier is at least one of a barcode, a QR code, a bokode, a color, a shape, a character, an image, or a size.

13. The system of claim 7, wherein the apparatus is configured:
- to be removably coupled to a mobile drive unit;
- to be moved by the mobile drive unit through a materials handling facility; and
- to capture a plurality of images representing a plurality of bins located within the materials handling facility.

14. The system of claim 7, wherein the apparatus is configured:
- to be removably coupled to an inventory holder;
- wherein the inventory holder is configured to be moved by a mobile drive unit through a materials handling facility; and
- to capture a plurality of images representing a plurality of bins located within the materials handling facility.

15. A computer-implemented method for verifying content of a bin, comprising:
- under control of one or more computing systems configured with executable instructions,
  - receiving a current bin image that includes a representation of content included in the bin;
  - correlating the received image with a stored image of the bin;
  - determining, based at least in part on the image and the stored image, if at least one item of content included in the bin has changed;
  - determining if a change to the content included in the bin was expected; and
  - determining, based at least in part on the determination of whether at least one item of content included in the bin has changed and based at least in part on whether the change to the content included in the bin was expected, whether the content included in the bin is accurate.

16. The computer-implemented method of claim 15, further comprising:
- determining that at least one item of content included in the bin has changed;
- determining that a change to the content included in the bin was not expected; and
- determining that the content included in the bin is not accurate.

17. The computer-implemented method of claim 15, further comprising:
- determining that at least one item of content included in the bin has changed;
- determining that a change to the content included in the bin was expected; and
- determining that the content included in the bin is accurate.

18. The computer-implemented method of claim 15, further comprising:
- determining that at least one item of content included in the bin has changed;
- determining that a change to the content included in the bin was expected; and
- determining that the content included in the bin is not accurate.

19. The computer-implemented method of claim 18, further comprising:
- in response to determining that the content included in the bin is not accurate, notifying an agent.

20. The computer-implemented method of claim 15, wherein the expected change to the bin is at least one of adding an item of content to the bin or removing an item of content from the bin.

* * * * *